United States Patent Office 2,900,232
Patented Aug. 18, 1959

2,900,232

SEPARATION OF POTASSIUM AND SODIUM IONS FROM A MIXTURE OF SODIUM AND POTASSIUM CHLORIDES

Jacques Lafont, Saint-Gratien, France, assignor to Societe d'Etudes Chimiques pour l'Industrie et l'Agriculture, Paris, France, a French company No Drawing. Application December 19, 1955
Serial No. 554,103

Claims priority, application France December 21, 1954

10 Claims. (Cl. 23—64)

This invention relates to a method of separating the potassium and sodium ions out of a mixture of potassium and sodium chlorides. Objects of the invention include the direct preparation of sodium bicarbonate and the subsequent obtainment of a potassium salt; the direct preparation of sodium bicarbonate and the subsequent production of potassium bicarbonate; the achievement of such reactions with a higher yield than heretofore obtainable; and the accomplishment of these results in the special instance where the starting material comprises a mixed salt containing sodium and potassium chlorides such as sylvinite. Further objects and advantages will appear as the disclosure proceeds.

In pending U.S. application Serial No. 280,648, filed April 4, 1952, now Patent No. 2,782,093, assignee of the present application, a method was described for preparing alkali metal bicarbonates produced independently from the corresponding chlorides. That method involved a cycle somewhat similar to that used in the so-called ammonia-soda processes in which ammonia was replaced with an amine reagent. According to the earlier application, a stream of carbon dioxide gas pure or diluted in an inert gas was passed at atmospheric pressure through an aqueous solution containing a single alkali metal chloride therein. The corresponding alkali metal bicarbonate was thus caused to precipitate and was then burned in a conventional manner for conversion into carbonate.

According to the present invention, sodium bicarbonate may be prepared from an aqueous solution of a mixture of sodium chloride and potassium chloride. For this purpose, according to the invention, solid isopropylamine bicarbonate is added, in predetermined proportions, to the solution containing both alkali metal chlorides. It is found that under these conditions a precipitate exclusively containing sodium bicarbonate can be obtained, with a very high yield, while the whole of the potassium chloride remains in solution. After the sodium bicarbonate precipitate has been separated off, the mother-liquor containing potassium chloride and very small amounts of sodium, may be treated by any conventional process either for recovery of the potassium chloride, or for conversion of the said chloride into some other potassium salt in situ.

In a preferred form of the invention, the mother-liquor is used for preparing potassium bicarbonate, in a manner known per se, by adding thereto an additional charge of potassium chloride, isopropylamine and carbon dioxide in appropriate proportions. In the operating conditions used according to the invention, the isopropylamine hydrochloride formed during the precipitation of the potassium bicarbonate in the first step of the operating cycle, does not interfere with the subsequent preparation of the potassium bicarbonate.

The starting material used according to the invention may be an aqueous solution containing potassium chloride and sodium chloride. Advantageously the solution used has a total chloride concentration that approximates saturation at ordinary temperature (around 20° C.), for in such conditions there is obtained sodium bicarbonate practically free of potassium with a high yield, without having to use excessive quantities of the mother-liquor. To this solution there is added isopropylamine bicarbonate in solid form, in approximately stoichiometrical proportions with respect to the dissolved sodium chloride. The mixture is stirred at room temperature for about 15 minutes and at least 90% of the sodium originally present in chloride form are thus precipitated in the form of bicarbonate.

It is thereafter possible to recover the residual potassium chloride in the mother-liquor after separation of the sodium bicarbonate precipitate, in the form of potassium bicarbonate containing only very small quantities of sodium. For this purpose, a quantity of potassium chloride is added to the mother-liquor which is at least equivalent to the quantity already contained in solution, and isopropylamine is added in the correct proportion for preparing the potassium bicarbonate by the procedure disclosed in the above mentioned French Patent 1,045,657, i.e. passing through the mixture a stream of carbon dioxide gas pure or diluted in inert gas, and there is obtained potassium bicarbonate having a sodium content less than 3%.

The subsequent preparation of the potassium bicarbonate may alternatively be effected by the use of solid isopropylamine bicarbonate in accordance with the present invention.

As a further alternative, mixtures of both alkali bicarbonates may be precipitated, in variable compositions, by modifying the relative proportions of the various ingredients used.

In the preparation of potassium bicarbonate, if an excess of the amine is used, the solution is found to contain, after separation of the precipitate, a certain residual amount of isopropylamine carbonate. According to the invention, this amine may be converted into the hydrochloride form by adding an aqueous solution of sodium chloride thereto. It is found that on stirring of the mixture during about 10 minutes, a new quantity of sodium bicarbonate precipitates. The mother liquor separated from the precipitate thus formed now contains practically only isopropylamine hydrochloride, and the latter may be treated in a conventional way for recovering the amine therefrom, and the amine recycled.

One important advantage of the method of the invention is that it makes it possible, starting from any kind of ore or solution containing both sodium and potassium chlorides, to achieve the following results simultaneously:
(1) Separate the Na and K ions while eliminating the requirement for a preliminary separation of said chlorides, as was considered absolutely necessary heretofore;
(2) Prepare sodium bicarbonate with a high yield; (3) In addition to the sodium bicarbonate, to prepare potassium chloride or another potassium salt and particularly the bicarbonate, or a mixture of sodium and potassium salts other than the chlorides thereof, and in particular the bicarbonates.

The starting solutions for the process of the invention may be prepared in any suitable way. Thus, an ore such as sylvinite may be dissolved at normal temperature in an appropriate amount of water. Or the method of the invention may be combined with a conventional process for producing sodium and potassium chlorides, such as by direct dissolution of the ore in the mine pit, and/or by thermal separation of alkali chlorides. According to the conventional process of thermal separation, sylvinite ore is treated with a brine at about 100° C. for preparing a solution saturated in both chlorides at such temperature. The undissolved sodium chloride is separated and the solution is cooled to crystallize selectively the potassium chloride, which in turn is then removed. The residual mother liquor, which is practically saturated at 20° C. both in potassium chloride and sodium chloride, may be employed as the starting material in the process of the invention, and the potassium chloride separated in the preceding operation may be reused, in whole or in part, as an additional charge for the preparation of potassium bicarbonate.

Some examples of the practical procedure for carrying out the invention will now be described for purposes of illustration but not of limitation:

Example 1

One hundred parts of a natural sylvinite ore containing 31.5% KCl, 63.6% NaCl and 4.9% insolubles, are dissolved in 210 parts water at room temperature (about 20° C.), and the insolubles are separated.

To this solution there are added 140 parts solid isopropylamine bicarbonate and the mixture is stirred for 15 minutes at room temperature. The sodium bicarbonate precipitates and is filtered off, washed and burned. There are obtained 52 parts $Na_2CO_3$, corresponding to a yield of 90% in terms of the sodium initially present.

To the filtrate from the foregoing operation there are added 30 parts potassium chloride and 100 parts of an aqueous solution of isopropylamine titling 91% of the amine by weight. A stream of carbon dioxide gas containing 35% $CO_2$ is bubbled through the resulting suspension at atmospheric pressure, while the mixture is stirred. After completion of the carbonation, the precipitated potassium bicarbonate is collected, and is found to correspond to a 92% yield on the basis of the introduced potassium chloride. The resulting product is found to contain less than 2% of sodium.

One hundred and seventy parts of a saturated sodium chloride solution in water are added to the mother-liquor stripped of the potassium bicarbonate. The mixture is stirred for 10 minutes and the precipitated sodium bicarbonate is separated off. After calcining 30 parts $Na_2CO_3$ are obtained.

The reacted amine is found to be present practically only in the form of hydrochloride in the final solution. It is regenerated by known methods and is recycled into the process.

Example 2

One hundred parts of the sylvinite ore used in Example 1 are treated with 105 parts water at about 100° C. The resulting solution is separated hot and 40 parts of solids are recovered containing 34.5 parts sodium chloride. The filtrate is cooled to about 20° C. and 15.4 parts of potassium chloride are thus recovered. To the solution from which the potassium chloride has been separated, 75 parts of solid isopropylamine bicarbonate are added. A sodium bicarbonate precipitate is thus recovered in an amount corresponding to a 90% yield on the basis of the dissolved sodium chloride.

The potassium chloride separated during the cooling step is added to the mother liquor, together with 45 parts of an aqueous isopropylamine solution titling 91% of the amine. A stream of carbon dioxide at atmospheric pressure is bubbled through the solution, and a potassium bicarbonate precipitate is obtained in an amount corresponding to a 90% yield relative to the whole quantity of the potassium chloride employed.

What I claim is:

1. In a method of treating a composite aqueous solution of potassium and sodium chlorides, the step of adding isopropylamine bicarbonate in solid form in substantially stoichiometrical proportion relative to the sodium chloride in the aforesaid composite solution thereby precipitating substantially all sodium chloride as sodium bicarbonate and separating the precipitate from the resulting solution containing potassium chloride.

2. In a method of treating a composite aqueous solution of potassium and sodium chlorides, the steps of adding isopropylamine bicarbonate in solid form in substantially stoichiometrical proportion relative to the sodium chloride in the aforesaid composite solution thereby precipitating substantially all sodium chloride as sodium bicarbonate, separating the said precipitate from the resulting solution containing potassium chloride and treating the said resulting solution for recovering the potassium chloride contained therein.

3. In a method of treating a composite aqueous solution of potassium and sodium chlorides, the steps of adding isopropylamine bicarbonate in solid form in substantially stoichiometrical proportion relative to the sodium chloride in the aforesaid composite solution thereby precipitating substantially all sodium chloride as sodium bicarbonate, separating the said precipitate from the resulting solution containing potassium chloride, treating the said resulting solution with isopropylamine and carbon dioxide in an amount at least equal to the stoichiometrical proportion relative to the potassium chloride thereby precipitating therefrom potassium bicarbonate substantially free of sodium and separating the precipitate from the residual solution.

4. In a method of treating a composite aqueous solution of potassium and sodium chlorides, the steps of adding isopropylamine bicarbonate in solid form in substantially stoichiometrical proportion relative to the sodium chloride in the aforesaid composite solution thereby precipitating substantially all sodium chloride as sodium bicarbonate, separating the said precipitate from the resulting solution containing potassium chloride, treating the said resulting solution with solid isopropylamine bicarbonate in an amount at least equal to the stoichiometrical proportion relative to the potassium chloride thereby precipitating therefrom potassium bicarbonate substantially free of sodium and separating the precipitate from the residual solution.

5. In a method of treating a composite aqueous solution of potassium and sodium chlorides, the steps of adding isopropylamine bicarbonate in solid form in substantially stoichiometrical proportion relative to the sodium chloride in the aforesaid composite solution thereby precipitating substantially all sodium chloride as sodium bicarbonate, separating the said precipitate from the resulting solution containing potassium chloride, adding to the said resulting solution an additional amount of potassium chloride at least equivalent to the amount already present in the solution, treating the so obtained mixture with isopropylamine and carbon dioxide in quantities corresponding at least to the stoichiometrical proportions relative to the total potassium chloride thereby precipitating potassium bicarbonate substantially free of sodium and separating the precipitate from the residual solution.

6. In a method of treating a composite aqueous solution of potassium and sodium chlorides, the steps of adding isopropylamine bicarbonate in solid form in substantially stoichiometrical proportion relative to the sodium chloride in the aforesaid composite solution thereby precipitating substantially all sodium chloride as sodium bicarbonate, separating the said precipitate from the resulting solution containing potassium chloride, treating the said resulting solution with isopropylamine and carbon dioxide in excess over the stoichiometrical proportions relative to the potassium chloride thereby precipitating therefrom potassium bicarbonate substantially free of sodium, separating the precipitate from the residual solution, adding to the said residual solution an aqueous saturated sodium chloride solution to precipitate sodium bicarbonate therefrom and separating the precipitate whereby is obtained a further amount of sodium bicarbonate and a solution containing substantially only isopropylamine hydrochloride.

7. The method claimed in claim 1 wherein said composite aqueous solution is obtained by dissolving a mixed salt of potassium chloride and sodium chloride in water.

8. The method claimed in claim 1 wherein said composite aqueous solution is obtained by dissolving sylvinite ore in water.

9. The method claimed in claim 1 wherein said composite aqueous solution is obtained by dissolving a KCl— and NaCl—containing ore in a minepit.

10. The method claimed in claim 1 wherein said composite aqueous solution comprises a brine obtained by treating sylvinite ore for the thermal separation of potassium chloride.

References Cited in the file of this patent
UNITED STATES PATENTS 2,782,093  Hulot et al. _____ Feb. 19, 1957

FOREIGN PATENTS 1,045,657  France _____ July 1, 1953

OTHER REFERENCES

Handbook of Chemistry, Lange, 9th edition, Handbook Publishers Inc., pp. 288–89, 307, 308.